US008993035B2

(12) United States Patent
de Man

(10) Patent No.: US 8,993,035 B2
(45) Date of Patent: Mar. 31, 2015

(54) EDIBLE WATER IN OIL EMULSION

(75) Inventor: Teunis de Man, Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 13/993,102

(22) PCT Filed: Nov. 24, 2011

(86) PCT No.: PCT/EP2011/070948
§ 371 (c)(1),
(2), (4) Date: Jun. 11, 2013

(87) PCT Pub. No.: WO2012/079957
PCT Pub. Date: Jun. 21, 2012

(65) Prior Publication Data
US 2013/0273230 A1    Oct. 17, 2013

(30) Foreign Application Priority Data
Dec. 17, 2010   (EP) ..................................... 10195564

(51) Int. Cl.
*A23D 7/00* (2006.01)

(52) U.S. Cl.
CPC ...................................... *A23D 7/001* (2013.01)
USPC .......................................... 426/603; 426/602

(58) Field of Classification Search
None
See application file for complete search history.

(56) References Cited

U.S. PATENT DOCUMENTS

| | | | |
|---|---|---|---|
| 2,521,219 A | 9/1950 | Holman et al. | |
| 2,521,242 A | 9/1950 | Mitchell, Jr. | |
| 2,615,160 A | 10/1952 | Baur | |
| 2,815,286 A | 12/1957 | Andre | |
| 3,120,438 A | 2/1964 | McIntire et al. | |
| 3,170,799 A | 2/1965 | Feuge et al. | |
| 3,270,040 A | 8/1966 | Bradshaw et al. | |
| 3,295,986 A | 1/1967 | Saslaw et al. | |
| 3,338,720 A | 8/1967 | Pichel | |
| 3,425,843 A | 2/1969 | Japikse | |
| 3,433,650 A | 3/1969 | Block et al. | |
| 3,528,823 A | 9/1970 | Rossen | |
| 3,634,100 A | 1/1972 | Fondu et al. | |
| 3,881,005 A | 4/1975 | Thakkar et al. | |
| 3,892,880 A | 7/1975 | Grolitsch | |
| 4,021,582 A | 5/1977 | Hsu | |
| 4,160,850 A | 7/1979 | Hallstrom et al. | |
| 4,226,894 A | 10/1980 | Gawrilow | |
| 4,232,052 A | 11/1980 | Nappen | |
| 4,234,606 A | 11/1980 | Gawrilow | |
| 4,288,460 A | 9/1981 | Ciliberto et al. | |
| 4,292,338 A | 9/1981 | Ainger et al. | |
| 4,294,862 A | 10/1981 | Wilke | |
| 4,308,288 A | 12/1981 | Hara et al. | |
| 4,341,813 A | 7/1982 | Ward | |
| 4,366,181 A | 12/1982 | Dijkshoorn et al. | |
| 4,375,483 A | 3/1983 | Shuford et al. | |
| 4,385,076 A | 5/1983 | Crosby | |
| 4,388,339 A | 6/1983 | Lomneth et al. | |
| 4,390,561 A | 6/1983 | Blair et al. | |
| 4,391,838 A | 7/1983 | Pate | |
| 4,486,457 A | 12/1984 | Schijf et al. | |
| 4,501,764 A | 2/1985 | Gercama et al. | |
| 4,578,274 A | 3/1986 | Sugisawa et al. | |
| 4,591,507 A | 5/1986 | Bodor et al. | |
| 4,826,699 A | 5/1989 | Soe | |
| 4,855,157 A | 8/1989 | Tashiro et al. | |
| 4,889,740 A | 12/1989 | Price | |
| 4,917,915 A | 4/1990 | Cain et al. | |
| 4,990,355 A | 2/1991 | Gupta et al. | |
| 5,127,953 A | 7/1992 | Hamaguchi | |
| 5,130,156 A | 7/1992 | Bergquist et al. | |
| 5,185,173 A | 2/1993 | Bethke et al. | |
| 5,186,866 A | 2/1993 | Ryuo et al. | |
| 5,352,475 A | 10/1994 | Tholl | |
| 5,391,382 A | 2/1995 | Chappel | |
| 5,429,836 A | 7/1995 | Fuisz et al. | |
| 5,447,735 A | 9/1995 | Miller | |
| 5,451,421 A | 9/1995 | Tanihara et al. | |
| 5,516,543 A | 5/1996 | Amankonah et al. | |
| 5,620,734 A | 4/1997 | Wesdorp et al. | |
| 5,707,670 A | 1/1998 | Mehansho et al. | |
| 5,858,445 A | 1/1999 | Huizinga et al. | |
| 5,904,949 A | 5/1999 | Reddy et al. | |
| 5,916,608 A | 6/1999 | Lanting et al. | |

(Continued)

FOREIGN PATENT DOCUMENTS

| AU | 2004262853 | 2/2005 |
|---|---|---|
| DE | 2253515 | 5/1974 |

(Continued)

OTHER PUBLICATIONS

Munuklu, P. 2007. Journal of Supercritical Fluids 43:181.*
Swern, D. 1979. Bailey's Industrial Oil and Fat Products, vol. 1, 4th edition. John Wiley & Sons, New York, p. 382-384.*
Gunstone, Frank 1983. Lipids in Foods. Chemistry, Biochemistry and Technology. Pergamon Press, New York. p. 152-154.*
Wikipedia, "Hydrogenation", pp. 1-10.

(Continued)

*Primary Examiner* — Carolyn Paden
(74) *Attorney, Agent, or Firm* — Gerard J. McGowan, Jr.

(57) ABSTRACT

The invention relates to an edible water in oil emulsion wrapper product wherein the amount of oil exudation is less than 1% at the temperature at which the amount of solid fat content on total product is 3%, wherein the fat is essentially free of hydrogenated fat and wherein said fat comprises less than 35 wt % saturated fatty acid (calculated on total fat) and less than 1 wt % trans unsaturated fatty acid (calculated on total product). The invention also relates to a process for the preparation of an edible water in oil emulsion wrapper product according to the invention.

15 Claims, 1 Drawing Sheet

(56) References Cited

U.S. PATENT DOCUMENTS

| | | | |
|---|---|---|---|
| 5,916,808 A | 6/1999 | Kole et al. | |
| 5,972,412 A * | 10/1999 | Sassen et al. | 426/603 |
| 5,985,350 A | 11/1999 | Gubler et al. | |
| 6,020,003 A | 2/2000 | Stroh et al. | |
| 6,031,118 A | 2/2000 | Van Amerongen et al. | |
| 6,056,791 A | 5/2000 | Weidner et al. | |
| 6,077,558 A | 6/2000 | Euber | |
| 6,106,886 A | 8/2000 | van Amerongen et al. | |
| 6,117,475 A | 9/2000 | van Amerongen et al. | |
| 6,117,478 A | 9/2000 | Dubberke | |
| 6,129,944 A | 10/2000 | Tiainen et al. | |
| 6,156,370 A | 12/2000 | Huizinga et al. | |
| 6,190,680 B1 | 2/2001 | Sakurada et al. | |
| 6,214,406 B1 | 4/2001 | Reimerdes | |
| 6,217,920 B1 | 4/2001 | Van Endenburg et al. | |
| 6,248,389 B1 | 6/2001 | Biller et al. | |
| 6,284,302 B1 | 9/2001 | Berger et al. | |
| 6,312,752 B1 | 11/2001 | Lansbergen et al. | |
| 6,316,030 B1 | 11/2001 | Kropf et al. | |
| 6,322,842 B1 | 11/2001 | Reddy et al. | |
| 6,352,737 B1 | 3/2002 | Dolhaine et al. | |
| 6,395,324 B1 | 5/2002 | Effey et al. | |
| 6,403,144 B1 | 6/2002 | El-Khoury et al. | |
| 6,423,326 B1 | 7/2002 | Shapiro | |
| 6,423,363 B1 | 7/2002 | Traska et al. | |
| 6,440,336 B1 | 8/2002 | Weinreich et al. | |
| 6,468,578 B1 | 10/2002 | Bodor et al. | |
| 6,533,252 B1 | 3/2003 | Bernard et al. | |
| 6,582,749 B2 | 6/2003 | Merrick et al. | |
| 6,616,849 B1 | 9/2003 | Osajima et al. | |
| 6,743,450 B2 | 6/2004 | Romanczyk, Jr. et al. | |
| 6,753,032 B1 | 6/2004 | Hirokawa et al. | |
| 6,800,317 B2 | 10/2004 | Wester et al. | |
| 6,808,737 B2 | 10/2004 | Ullanoormadam | |
| 6,827,964 B2 | 12/2004 | Wester et al. | |
| 6,929,816 B2 | 8/2005 | Wester | |
| 6,986,846 B2 | 1/2006 | Shekunov et al. | |
| 7,118,773 B2 * | 10/2006 | Floeter et al. | 426/603 |
| 7,223,435 B2 | 5/2007 | Besselink et al. | |
| 7,601,184 B2 | 10/2009 | Tischendorf | |
| 7,618,670 B2 | 11/2009 | Ullanoormadam | |
| 7,807,208 B2 | 10/2010 | Ullanoormadam | |
| 7,862,751 B2 | 1/2011 | Foster et al. | |
| 8,025,913 B2 * | 9/2011 | van den Berg et al. | 426/602 |
| 8,124,152 B2 * | 2/2012 | Janssen et al. | 426/285 |
| 8,147,895 B2 * | 4/2012 | Barendse et al. | 426/602 |
| 8,211,470 B2 | 7/2012 | Kim | |
| 8,431,370 B2 | 4/2013 | ten Brink et al. | |
| 8,586,122 B2 | 11/2013 | McNeill et al. | |
| 2001/0029047 A1 | 10/2001 | Liu et al. | |
| 2002/0034577 A1 | 3/2002 | Vogensen | |
| 2002/0048606 A1 | 4/2002 | Zawistowski | |
| 2002/0076476 A1 | 6/2002 | Kuil et al. | |
| 2002/0132035 A1 | 9/2002 | Tamarkin et al. | |
| 2002/0168450 A1 | 11/2002 | Drudis et al. | |
| 2003/0068425 A1 | 4/2003 | Khare | |
| 2003/0124228 A1 | 7/2003 | Goto et al. | |
| 2003/0124288 A1 | 7/2003 | Merziger et al. | |
| 2003/0165572 A1 | 9/2003 | Auriou | |
| 2003/0203854 A1 | 10/2003 | Pischel et al. | |
| 2004/0076732 A1 | 4/2004 | Valix | |
| 2004/0101601 A1 | 5/2004 | Loh et al. | |
| 2004/0105931 A1 | 6/2004 | Basheer et al. | |
| 2004/0126475 A1 | 7/2004 | Hashizume et al. | |
| 2004/0166204 A1 | 8/2004 | Smith et al. | |
| 2004/0197446 A1 | 10/2004 | Haynes et al. | |
| 2005/0014158 A1 | 1/2005 | Adam et al. | |
| 2005/0069619 A1 | 3/2005 | Bot et al. | |
| 2005/0069625 A1 | 3/2005 | Chimel et al. | |
| 2005/0123667 A1 | 6/2005 | Sakuma et al. | |
| 2005/0170062 A1 | 8/2005 | Burling et al. | |
| 2005/0175745 A1 | 8/2005 | Zawistowski | |
| 2005/0196512 A1 | 9/2005 | Nakhasi et al. | |
| 2006/0019021 A1 | 1/2006 | Plank et al. | |
| 2006/0035871 A1 | 2/2006 | Auweter et al. | |
| 2006/0051479 A1 | 3/2006 | Chiavazza et al. | |
| 2006/0115553 A1 | 6/2006 | Gautam et al. | |
| 2006/0280855 A1 | 12/2006 | Van den Berg et al. | |
| 2007/0054028 A1 | 3/2007 | Perlman et al. | |
| 2007/0286940 A1 | 12/2007 | Herzing et al. | |
| 2008/0089978 A1 | 4/2008 | Grigg et al. | |
| 2008/0187645 A1 | 8/2008 | Ekblom et al. | |
| 2008/0193628 A1 | 8/2008 | Garbolino et al. | |
| 2008/0193638 A1 * | 8/2008 | McMaster et al. | 427/126.3 |
| 2008/0226786 A1 | 9/2008 | Ward et al. | |
| 2008/0268130 A1 | 10/2008 | Bons et al. | |
| 2009/0022868 A1 | 1/2009 | Van Den Bremt et al. | |
| 2009/0029024 A1 | 1/2009 | McNeill et al. | |
| 2009/0041898 A1 | 2/2009 | Garbolino et al. | |
| 2009/0263559 A1 | 10/2009 | Van Horsen et al. | |
| 2011/0070335 A1 | 3/2011 | Brugger et al. | |
| 2011/0244111 A1 * | 10/2011 | Den Adel et al. | 426/609 |
| 2011/0287160 A1 * | 11/2011 | Dobenesque et al. | 426/604 |
| 2011/0311706 A1 * | 12/2011 | van den Berg et al. | 426/602 |
| 2011/0311707 A1 * | 12/2011 | Bezemer et al. | 426/603 |
| 2012/0018535 A1 | 1/2012 | Wubbolts et al. | |
| 2013/0004522 A1 | 1/2013 | Dvir et al. | |
| 2013/0115361 A1 * | 5/2013 | Floter et al. | 426/603 |

FOREIGN PATENT DOCUMENTS

| | | |
|---|---|---|
| DE | 10253193 | 6/2004 |
| EP | 0021483 | 1/1981 |
| EP | 0041299 | 12/1981 |
| EP | 0089082 | 9/1983 |
| EP | 0063835 | 3/1985 |
| EP | 0237120 | 9/1987 |
| EP | 0289069 | 4/1988 |
| EP | 0294692 | 12/1988 |
| EP | 393963 | 4/1990 |
| EP | 0327225 | 7/1993 |
| EP | 572051 | 12/1993 |
| EP | 0505007 | 11/1995 |
| EP | 0775444 | 5/1997 |
| EP | 0780058 | 6/1997 |
| EP | 0796567 | 9/1997 |
| EP | 897671 | 2/1999 |
| EP | 0898896 | 3/1999 |
| EP | 0962150 | 12/1999 |
| EP | 0594152 | 2/2000 |
| EP | 1114674 | 7/2001 |
| EP | 1180545 | 2/2002 |
| EP | 1197153 | 4/2002 |
| EP | 1238589 | 8/2002 |
| EP | 1285584 | 2/2003 |
| EP | 1419698 | 5/2004 |
| EP | 1419811 | 5/2004 |
| EP | 1557090 | 7/2005 |
| EP | 1651338 B1 | 5/2006 |
| EP | 1795257 | 6/2007 |
| EP | 1815752 | 8/2007 |
| EP | 2016834 | 1/2009 |
| EP | 2123164 | 11/2009 |
| EP | 2181604 | 5/2010 |
| EP | 1865786 | 11/2011 |
| FR | 2243653 | 8/1976 |
| FR | 2776167 | 9/1999 |
| GB | 1114674 | 5/1968 |
| GB | 1537011 | 12/1978 |
| GB | 1538958 | 1/1979 |
| GB | 2095966 | 10/1982 |
| GB | 2095968 | 10/1982 |
| GB | 2177283 | 1/1987 |
| GB | 2208296 | 3/1989 |
| GB | 2292949 | 3/1996 |
| GB | 2320175 | 2/2001 |
| JP | 59051742 | 3/1984 |
| JP | 62239949 | 10/1987 |
| JP | 02299544 | 12/1990 |
| JP | 2003210107 | 7/2003 |
| NL | WO2005014158 * | 2/2005 |
| WO | WO9308699 | 5/1993 |
| WO | WO9521688 | 8/1995 |
| WO | WO9614755 | 5/1996 |

(56) References Cited

FOREIGN PATENT DOCUMENTS

| WO | WO9619115 | 6/1996 |
|---|---|---|
| WO | WO9638047 | 12/1996 |
| WO | WO9742830 | 11/1997 |
| WO | WO9847386 | 10/1998 |
| WO | WO9956558 | 11/1999 |
| WO | WO0009636 | 2/2000 |
| WO | WO0041491 | 7/2000 |
| WO | WO0045648 | 8/2000 |
| WO | WO0100046 | 1/2001 |
| WO | WO0132035 | 5/2001 |
| WO | WO0143559 | 6/2001 |
| WO | WO0166560 | 9/2001 |
| WO | WO0178529 | 10/2001 |
| WO | WO0191569 | 12/2001 |
| WO | WO02100183 | 12/2002 |
| WO | WO03043430 | 5/2003 |
| WO | WO03084337 | 10/2003 |
| WO | WO03096817 | 11/2003 |
| WO | WO03103633 | 12/2003 |
| WO | WO2004093571 | 11/2004 |
| WO | WO2005014158 | 2/2005 |
| WO | WO2005071053 | 8/2005 |
| WO | WO2005074717 | 8/2005 |
| WO | WO2005074726 | 8/2005 |
| WO | WO2006005141 | 1/2006 |
| WO | WO2006066979 | 6/2006 |
| WO | WO2006079445 | 8/2006 |
| WO | WO2006087090 | 8/2006 |
| WO | WO2006087091 | 8/2006 |
| WO | WO2006087092 | 8/2006 |
| WO | WO2006087093 | 8/2006 |
| WO | WO2007022897 | 3/2007 |
| WO | WO2007024770 | 3/2007 |
| WO | WO2007039020 | 4/2007 |
| WO | WO2007039040 | 4/2007 |
| WO | WO2007096211 | 8/2007 |
| WO | WO2007096243 | 8/2007 |
| WO | WO2008125380 | 10/2008 |
| WO | WO2009068651 | 6/2009 |
| WO | WO2010053360 | 5/2010 |
| WO | WO2010060713 | 6/2010 |
| WO | WO2010069746 | 6/2010 |
| WO | WO2010069747 | 6/2010 |
| WO | WO2010069750 A1 | 6/2010 |
| WO | WO2010069751 | 6/2010 |
| WO | WO2010069752 | 6/2010 |
| WO | WO2010069753 | 6/2010 |
| WO | WO2011160921 | 12/2011 |

OTHER PUBLICATIONS

Wikipedia Article Sources and Contributors, "Interersterified fat", pp. 1-4.
Charteris et al., "Edible table (bio) spread containign potntially probiotic *Lactobacillus* and *Bifidobacterium* species", International Journal of Diary Technology, Feb. 2002, vol. 55, No. 1, pp. 44-56.
Elvers et al., "Margarines and shortenings", Ullmanns Encyclopedia of Industrial Chemistry, 1990, vol. A16, 5th Edition, pp. 156-158.
Gunstone et al., "Occurrence and Characterisation of Oils and Fats", The Lipid Handbook, 2007, Edition 3e, pp. 5, 55, 63, 66 and 67.
De Cock, "Structure development in confectionery products: importance of triacylglycerol composition", Universiteit Gent Faculteit Bio-ingenieurswetenschappen, 2011, pp. 1-73.
Munuklu et al., "Particle formation of edible fats using the supercritical melt micronization process (ScMM)", Journal of Supercritical Fluids, 2007, vol. 43, pp. 181-190.
van den Enden et al., "A Method for the Determination of the solid Phase Content of Fats Using Pulse Nuclear Magnetic Resonance", Fette Seifen Anstrichmittel, Sep. 1977, vol. 80, pp. 180-186.
Garti et al., "Stabilization of Water-in-Oil Emulsions by Submicrocrystalline α-form Fat Particles", Journal of American Oil Chemist Society, 1998, vol. 75, No. 12, pp. 1825-1831.
PCT International Search Report in PCT application PCT/EP2011/070948 dated Feb. 9, 2012 with Written Opinion.
European Search Report in EP application EP 10 19 5564 dated May 20, 2011.
PCT International Search Report in PCT application PCT/EP 2011/071150 dated Jan. 30, 2012 with Written Opinion.
European Search Report in EP application EP 10 19 5567 dated May 24, 2011.
PCT International Search Report in PCT application PCT/EP 2011/071282 dated Jan. 25, 2012 with Written Opinion.
European Search Report in EP application EP 10 19 5650 dated May 4, 2011.
Bailey's Industrial Oil and Fat Products, 1979, pp. 382-384, vol. 14th Edition.
Frank D. Gunstone et al., Lipids in Foods Chemistry Biochemistry and Technology, 1983, pp. 152-154.
Second Edition The American Heritage Dictionary, The American Heritage Dictionary, Jan. 1, 1982, p. 407 & 1225, 1-4, Houghton Mifflin Co., US.
Starches, Tate & Lyle product brochure 2009 pp. 1-16, Nov. 2009, 1-16.
Strawberry Powder Flavor GA1403, Strawberryflavor.com 2005 p. 1, Jan. 1, 2005, 1.
A. R. Norizzah, Effects of Chemical Interesterification on Physicochemical Properties of Palm Stearin and Palm Kernel Olein Blends, Food Chemistry 86 229, 2004, pp. 229-235, 86, Elsevier.
Anonymous, Particle Sizes of Milk Powders, Dairy Ingredients, 2000, pp. 1-2, 2-4, Dairy Products Technology Center, US.
Belitz et al., Milk and Dairy Products, Food Chemistry, 1999, 470-474, 497-498XP-002264854, Table 10.4, Springer Verlag, Berlin, DE.
Davidsson, Powdered fats for soups and sauces—and a range of other food products, Food Ingredients and Analysis International, 2001, 29-30, 23 (4).
De Graaf, Consumption of tall oil-derived phytosterols in a chocolate matrix . . . , British Journal of Nutrition 2002 88 pp. 479-488, Jun. 18, 2002, 479-488, 88, British Journal of Nutrition.
Fischer, Improved fruit fibres for modern food processing, Food Ingredients and Analysis Int'l, 2004, pp. 29-31, 73-3.
Garti et al, Stabilization of water-in-oil Emulsions by Submicrocrystallineα-Form Fat Particles, Journal of the American Oil Chemists Society, Jan. 1, 1998, 1825-1831, 75 No. 12.
Garti et al., Stabilization of Water-in-Oil Emulsions by Submicrocrystalline a-Form Fat Particles, Journal of the American Oil Chemists' Society, 1998, 1825-1831, 75, 12.
Gerber et al., Effect of Process-Parameters on Particles Obtained by the Rapid Expansion of Supercritical Solutions, World Congress on Particle Technology 3, 1998, 1-11.
Gunstone et al, Food uses of oils and fats, The Lipid Handbook, 2007, 336-341, Third Edition.
Gunstone et al., Polymorphism and nomenclature of lipid crystal forms, The Lipid Handbook 1995 8.1.3 p. 405, Jan. 1, 1995, p. 405, 8.13, Chapman & Hall.
Gunstone, The Lipid Handbook, The Lipid Handbook 2nd ED, 1994, 321, 2nd ED, Chapman & Hall.
Johansson et al., Water-in-Triglyceride Oil Emulsions, Effect of Fat Crystals on Stability, JAOCS, 1995, 939-950, 72(8), AOCS Press.
Kochhar, Influence of Processing on Sterols of Edible Vegetable Oils, Prog Lipid Res, 1983, 161-188, 22, US.
Lipson et al, Interpretation of X-ray Powder diffraction Patterns, Lipson 1970, 1970, 244-263, Chapter 9.
Lopez et al, Milk fat and primary fractions obtained by dry fractionation1.Chemical composition and crystallisation properties, Chemistry and Physics of Lipids, 2006, 17-33, 144, Elsevier.
Micallef et al., Beyond blood lipids: phytosterols, statins and omega-3 polyunsaturated fatty acid therapy for hyperlipidemia, Journal of Nutritional Biochemistry, Jun. 19, 2009, 927-939, 20, Elsevier.
Munuklu et al., Supercritical Melt Micronization Using the Particles from Gas Saturated Solution Process, American Chemical Society Symposium, 2003, 353-369, 860 23.
Munuklu, Experimental and Analytical Facilities, Delft University of Technology 2005 4 pp. 41-51, Dec. 16, 2005, 41-51.
Pernetti et al, Structuring of edible oils by alternatives to crystalline fat, Colloid & Interface Science, Jul. 18, 2007, 221-231, vol. 12.

(56) References Cited

OTHER PUBLICATIONS

Shahidi et al, Margarine processing plants and equipment, Bailey's Industrial Oil and Fat Products, 2005, 502 and 518, 5.
Turk et al., Micronization of pharmaceutical substances by the rapid expansion of supercritical solutions (RESS): a promising method to improve bioavailability of poorly soluble pharmaceutical agents, Journal of Supercritical Fluids, 2002, 75-84, 22, Elsevier.
Van Den Enden et al., Rapid Determination of Water Droplet Size Distributions by PFG-NMR, Journal of Colloid and Interface Science, 1990, 105-113, vol. 140 No. 1.
Chapman et al., The Polymophism of Glycerides, Chemical Reviews, 1962, 433-456, 62.
Dervisoglu et al., Note. The Effect of Citrus Fibre on the Physical, Chemical and Sensory Properties of Ice Cream, Food Sci Technol International Abstract, 2006, p. 1 (Abstract), 12.
Ferguson et al., The Polymorphic Forms or Phases of Triglyceride Fats, Chemical Reviews, Oct. 1, 1941, 355-384, 29.
IPRP in PCTEP2004006544, Jan. 3, 2006.
IPRP in PCTEP2009066104, Sep. 28, 2010.
IPRP in PCTEP2009066105, Mar. 24, 2011.
IPRP2 in PCTEP2009066095, Mar. 24, 2011.
IPRP2 in PCTEP2009066105, Mar. 24, 2011.
IPRP2 in PCTEP2011071397, Mar. 21, 2013.
Search Report in EP03077247, Apr. 7, 2004.
Search Report in EP08172284, Jun. 4, 2009.
Search Report in EP08172298, Apr. 9, 2009.
Search Report in EP08172300, Jun. 5, 2009.
Search Report in EP10196443, May 27, 2011.
Search Report in PCTEP009066095, Mar. 23, 2010.
Search Report in PCTEP2004006544, Jan. 28, 2005.
Search Report in PCTEP2009066104, Jan. 14, 2010.
Search Report in PCTEP2009066105, Jan. 28, 2010.
Search Report in PCTEP2011071397, Feb. 9, 2012.
Written Opinion in EP03077247, Apr. 7, 2004.
Written Opinion in EP08172284, Jun. 4, 2009.
Written Opinion in EP08172298, Apr. 9, 2009.
Written Opinion in EP08172300, Jun. 5, 2009.
Written Opinion in PCTEP2009066095, Mar. 23, 2010.
Written Opinion in PCTEP2009066104, Jan. 14, 2010.
Written Opinion in PCTEP2009066105, Jan. 28, 2010.
Written Opinion in PCTEP2011071397, Feb. 9, 2012.

* cited by examiner

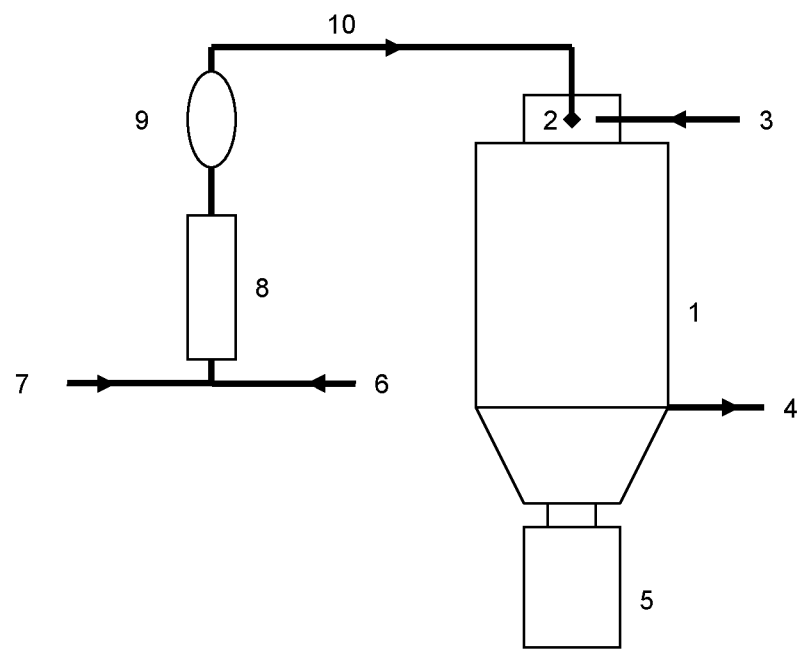

EDIBLE WATER IN OIL EMULSION

FIELD OF THE INVENTION

The present invention relates to edible water in oil emulsion wrapper products and process for the preparation thereof.

BACKGROUND OF THE INVENTION

Fat continuous food products are well known in the art and include for example shortenings comprising a fat phase and water in oil spreads like margarine comprising a fat phase and an aqueous phase.

The fat phase of margarine and similar edible fat continuous spreads is often a mixture of liquid oil (i.e. fat that is liquid at ambient temperature) and fat which is solid at ambient temperatures. The solid fat, also called structuring fat or hardstock fat, serves to structure the fat phase (being the case in for example a shortening as well as in a water in oil emulsion) and helps to stabilize the aqueous phase, if present, by forming a fat crystal network. For a margarine or spread, ideally the structuring fat has such properties that it melts or dissolves at mouth temperature. Otherwise the product may have a heavy and/or waxy mouthfeel.

Margarine is generally defined as a composition containing at least 80 wt % fat and about 20 wt % aqueous phase. In contrast, emulsions containing less than 80 wt % fat are generally called spreads. Nowadays the terms margarine and spread are sometimes used interchangeably although in some countries the commercial use of the term margarine is subject to certain regulatory requirements. The difference between margarine and spread is mainly the amount of fat. Therefore, for the purpose of the present invention the terms margarine and spread will be used interchangeably.

Margarine may be used for different applications including spreading, (shallow) frying and baking. In the market place margarine is generally sold as one of three principal types, namely hard or stick margarine (generally referred to as wrapper margarine), soft or tub margarine and liquid or pourable margarine. Wrapper margarine would typically have a Stevens hardness value of more than 140 gram at 5 degrees Celsius and more than 50 gram at 20 degrees Celsius. Tub margarine would typically have a Stevens hardness value of 20 to 140 gram at 5 degrees Celsius and 10 to 20 gram at 20 degrees Celsius. The Stevens hardness value is the value as measured according to the method described in the experimental section. Liquid margarine would typically have a Bostwick value of at least 4 at 15° C., preferably a Bostwick value of at least 7. The Bostwick value is the value as measured according to the method described in the experimental section.

Wrapper margarine needs to have a certain firmness (also called hardness) to keep its shape preferably also at higher temperatures. It should also be able to withstand a certain amount of pressure to enable stacking of the wrapper margarine like e.g. at the manufacturing site, during transport, storage or presentation in a shop.

To achieve the required amount of firmness in a wrapper margarine (expressed as Stevens hardness value) the choice of fats that can practically be used as structuring fat is rather limited. If the melting point of the structuring agent is too high the melting properties in the mouth are unsatisfactory. If on the other hand, the melting point is too low, the emulsion stability will be negatively affected.

A wrapper margarine thus needs to be rather firm. This usually requires a relatively high amount of saturated fatty acid (SAFA) in the structuring fat. However, some consumers prefer wrapper margarines that are low in SAFA and preferably have a good nutritional profile (by providing for example essential fatty acids like omega-3 and omega-6).

Trans unsaturated fatty acids are known to have a good structuring capacity and sometimes are used in addition or instead of SAFA to impart the required structure in a wrapper margarine. However, some experts have called for reductions in these fatty acids to improve cardiovascular health.

Triacylglycerols (TAG) are the major constituents of natural fats and oils and are esters of glycerol and fatty acids. The chemical structure of the fatty acid and the distribution of the fatty acids over the glycerol backbone determine (at least partly) the physical properties of a fat. The physical properties of fats, like for example the solid fat content (SFC) expressed as N-value, can be modified by altering the chemical structure of the fat. Well known techniques that are widely used include hydrogenation and interesterification.

Hydrogenation alters the degree of unsaturation of the fatty acids and as such alters the fatty acid composition. This allows e.g. plastic fats to be made from liquid oils. A draw back of hydrogenation, especially of partial hydrogenation, is the formation of by products like e.g. trans unsaturated fatty acids. Furthermore additional process steps are required and some consumers perceive a chemical process such as hydrogenation as undesirable.

Interesterification retains the fatty acid composition but alters the distribution of the fatty acids over the glycerol backbones. Interesterification can be done chemically or with the aid of enzymes. Usually a mixture of two different fats, that by themselves are not or less suitable as a structuring fat, is subjected to interesterification. The resulting interesterified fat will have improved structuring properties compared to the starting materials. A draw back of interesterification may be the formation of by products like e.g. free fatty acids and diglycerides. Also enzymatic interesterification introduces additional process steps which may be complicated and introduce additional costs. Furthermore some consumers perceive chemically modified fats as unnatural and therefore undesirable.

U.S. Pat. No. 4,341,813 concerns stick and pat margarines wherein the blend of vegetable oil and hard stock is high in polyunsaturates and has a low-trans-isomer fatty acid content. The fat blend comprises hydrogenated and interesterified fat.

EP 0 041 299 relates to natural fat blends which can be used for producing margarines which are packaged in wrappers. The fat blend is substantially free of hydrogenated and interesterified fats. The fat blends contain more than 35 wt % SAFA on total fat.

GB 2 292 949 relates to stick-type margarines and other spreads which contain no detectable levels of trans fatty acids or tropical oils and comprise specific blends of co-interesterified liquid unsaturated vegetable oils hardstocks.

When lowering the amount of SAFA (while keeping the fat essentially free of hydrogenated fat) in a wrapper margarine, softer and/or less (temperature) stable products could not be avoided up to now.

SUMMARY OF THE INVENTION

We have found an edible water in oil wrapper product which comprises less than 35 wt % saturated fatty acid but which nevertheless is firm and temperature stable.

Accordingly in a first aspect the invention relates to an edible water in oil emulsion wrapper product wherein the amount of oil exudation is less than 1% at the temperature at which the amount of solid fat content on total product is 3%, wherein the fat is essentially free of hydrogenated fat and wherein said fat comprises less than 35 wt % saturated fatty acid (calculated on total fat) and less than 1 wt % trans unsaturated fatty acid (calculated on total product).

The invention also relates to a process for the preparation of an edible water in oil emulsion wrapper product according to the invention.

BRIEF DESCRIPTION OF THE DRAWINGS

FIG. 1 is a schematic representation of the set up for the continuous production of edible fat powder as used for the preparation of examples 1 to 4.

DETAILED DESCRIPTION OF THE INVENTION

Weight percentage (wt %) is based on the total weight of the composition unless otherwise stated. The terms 'fat' and 'oil' are used interchangeably. Where applicable the prefix 'liquid' or 'solid' is added to indicate if the fat or oil is liquid or solid at ambient temperature as understood by the person skilled in the art. The term 'structuring fat' refers to a fat that is solid at ambient temperature. Ambient temperature is a temperature of about 20 degrees Celsius.

Edible water in oil emulsion wrapper products according to the invention are wrapper products wherein the amount of oil exudation is less than 1% at the temperature at which the amount of solid fat content on total product is 3%, said wrapper product having a Stevens hardness value of more than 140 gram at 5 degrees Celsius and more than 50 gram at 20 degrees Celsius and comprising at least 50 wt % fat wherein the fat is essentially free of hydrogenated fat and wherein said fat comprises less than 35 wt % saturated fatty acid (calculated on total fat) and less than 1 wt % trans unsaturated fatty acid (calculated on total product).

Wrapper Product

The edible water in oil emulsion is a wrapper product and as such has a certain firmness (also called hardness) to it. Wrapper products (i.e. wrapper margarine) are well known but tend to vary in hardness. Consumers may prefer a certain hardness of the product at different temperatures depending on the intended use. The wrapper product of the invention is relatively firm and has a Stevens hardness value of more than 140 gram at 5 degrees Celsius and more than 50 gram at 20 degrees Celsius.

Preferably the Stevens hardness value at 5 degrees Celsius is from 150 to 2000 gram, more preferably 250 to 1500 gram and even more preferably 350 to 1000 gram.

Preferably the Stevens hardness value at 20 degrees Celsius is from 50 to 500 gram, more preferably 100 to 350 gram and even more preferably 150 to 200 gram.

Products that are relatively firm and keep their firmness even at ambient temperatures may be preferred by consumers as such products keep their shape and are e.g. less messy to use. The product should also not be too firm as this would be detrimental to ease of use, like e.g. portioning of the product. Therefore preferred wrapper products have a Stevens hardness value of 150 to 2000 gram at 5 degrees Celsius and 50 to 500 gram at 20 degrees Celsius, a Stevens hardness value of 250 to 1500 gram at 5 degrees Celsius and 100 to 350 gram at 20 degrees Celsius, or a Stevens hardness value of 350 to 1000 gram at 5 degrees Celsius and 150 to 200 gram at 20 degrees Celsius.

Temperature Stability

The amount of solid fat in a water in oil emulsion will go down as the temperature of the emulsion rises. At the same time the emulsion may be less firm at a higher temperature as the amount of solid fat diminishes. The wrapper product according to the invention is an edible water in oil emulsion wherein the amount of oil exudation is less than 1% at the temperature at which the amount of solid fat content on total product is 3%.

The amount of solid fat on total product can be determined using standard techniques available to the skilled person according to the protocol described in the description of the examples below. It should be noted that this concerns the solid fat content as measured in the total product. The temperature at which the solid fat content is 3% is the temperature at which the amount of oil exudation is determined by following the protocol described in the description of the examples below.

Preferably the amount of oil exudation is less than 1% at the temperature at which the amount of solid fat content on total product is 2.5%, more preferably 2%, even more preferably 1.5% and still even more preferably 1%. It will be appreciated that such products show an increased heat stability and are especially suitable for ambient distribution or for example warmer climates.

Fat Phase

Wrapper products are mainly used for baking (like for example in a cake), frying (like for example shallow frying) and cooking (like for example in making gravy). Such applications require higher amounts of fat. Preferably the amount of fat is from 50 to 95 wt %, more preferably 60 to 90 wt % and even more preferably 70 to 85 wt %.

The amount of saturated fatty acid (SAFA) (calculated on total fat) is less than 35 wt %. This provides for a product with an improved nutritional profile as a high daily intake of SAFA is generally associated with cardiovascular diseases. To further improve the nutritional profile of the wrapper product preferably the amount of saturated fatty acid is less then 30 wt %, more preferably less then 25 wt % and even more preferably less than 20 wt %. Examples of such wrapper products are products with an amount of SAFA of 10 to 35 wt %, 15 to 30 wt % or 20 to 25 wt %.

Lowering the amount of SAFA used to result in a wrapper product that was less firm. One way to compensate for this loss of firmness is to increase the amount of trans unsaturated fatty acid which is known for its structuring capability. However, trans unsaturated fatty acids are associated with cardiovascular disease and the wrapper product of the invention therefore comprises less than 1 wt % trans unsaturated fatty acid calculated on total product. Preferably the amount of trans unsaturated fatty acid is less than 1 wt % calculated on total fat.

The fat is essentially free of hydrogenated fat as hydrogenation may form unwanted byproducts. Interesterification of fats is a well known technique to improve the structuring capacity of fats. However, it may also increase the number of process steps required and thus result in more complex or expensive processing. Therefore, preferably less than 50 wt % of the fat of the wrapper product is interesterified. More preferably the fat is essentially free of interesterified fat.

Making of Wrapper Products

Wrapper products according to the present invention are made using edible fat powder to provide at least part or all of the structuring fat in a pre-crystallized form (i.e. the fat crystals do not form from the solution comprising liquid and solid fat). The use of fat powder makes it possible to lower the amount of SAFA while still providing a firm and temperature stable wrapper product.

As such, the wrapper product according to the invention preferably is a wrapper product wherein the emulsion is prepared using edible fat powder comprising structuring fat.

Edible fat powders are free flowing powders at a temperature of about 5 degrees Celsius. The term 'powder' is defined as generally understood by the skilled person.

The structuring fat may be a single fat or a mixture of different fats. The structuring fat may be of vegetable, animal or marine origin. Preferably at least 50 wt % of the structuring fat (based on total amount of structuring fat) is of vegetable origin, more preferably at least 60 wt %, even more preferably at least 70 wt %, still more preferably at least 80 wt %, even still more preferably at least 90 wt % and even still more further preferably at least 95 wt %. Most preferably the structuring fat essentially consists of structuring fat of vegetable origin.

The edible fat powder serves to structure the wrapper product by providing at least part of the structuring fat for the water in oil emulsion. Natural fats as commercially available may comprise minor amounts of other components like for example monoglycerides that are naturally present and may likewise be present in the fat powder.

In addition to these naturally present components the edible fat powder may comprise additional components like for example emulsifier or liquid oil. It will be appreciated that care must be taken to prevent the properties of the fat powder to be detrimentally affected. For example, the presence of liquid oil may affect the ability to form a powder (e.g. may result in a sticky powder or no recognizable powder), depending on the natural fats and the liquid oil as well as the amounts thereof. It is within the reach of the skilled person to determine without undue burden how much of the additional components may be present using common general knowledge.

As the purpose of the fat powder is to provide structure to the water in oil emulsion it may be preferred not to include too many and/or too much of additional components that do not primarily add to the structuring ability of the fat powder, like for example protein and carbohydrates. Preferably the fat powder comprises not more than 20 wt % of protein and/or carbohydrates, more preferably not more than 15 wt %, even more preferably not more than 10 wt %, and still more preferably not more than 5 wt %. Most preferably no protein and carbohydrates are present.

As the presence of water may complicate the production of edible fat powders it is preferred that the amount of water is not more than 20 wt %, preferably not more than 10 wt % and more preferably not more than 5 wt %. Most preferably no water is present.

The amount of fat powder used is suitably chosen such that the required structuring is obtained. It will be appreciated that the amount of fat powder depends on the amount of structuring fat in the fat powder and the desired amount of structuring fat on total product. Preferably the amount of structuring fat on total amount of product is 1 to 30 wt %, more preferably 2 to 25 wt % and even more preferably 4 to 20 wt %.

To optimize the structuring capacity and/or impression as required for a wrapper product, structuring fats having a certain solid fat content (on fat) are preferred. Therefore preferably the solid fat content measured on fat is 17 to 50 for N10, 11 to 35 for N20, 3 to 18 for N30, 0 to 10 for N35 and 0 to 5 for N40. Like for example: 34 to 50 for N10, 23 to 35 for N20, 3 to 16 for N30, 0 to 3 for N35 and 0 for N40; 17 to 34 for N10, 11 to 23 for N20, 3 to 11 for N30, 0 to 5 for N35 and 0 to 2.5 for N40; or 34 to 50 for N10, 23 to 35 for N20, 11 to 18 for N30, 5 to 10 for N35 and 2.5 to 5 for N40.

Suitable methods to prepare the fat powder include for example Super Critical Melt Micronisation (ScMM), also known as particles from gas saturated solutions (PGSS). This is a commonly known method and is for example described in J. of Supercritical Fluids 43 (2007) 181-190 and EP1651338.

Preferably the wrapper product according to the invention preferably is a wrapper product wherein the emulsion is prepared using fat powder comprising structuring fat obtainable by supercritical melt micronisation.

We have found that using fat powder comprising structuring fat obtainable by supercritical melt micronisation provides for a wrapper product with the required firmness but which does not leave a sticky/waxy mouthfeel after it has been used in an application that requires heating the wrapper product like for example baking, frying and cooking.

Suitable fat powders may be prepared using ScMM taking care that the amount of dissolved $CO_2$ is relatively high like for example 20, 25, 30 or 35 wt %. This is a function of the pressure and temperature of the $CO_2$-melt mixture. It is also important to keep the temperature of the nozzle and the crystallization temperature of the structuring fat close to each other. Furthermore, it is important that enough external cooling gas is used.

It is important that the fat powder is not subjected to storage temperatures at which the structuring fat melts as this severely reduces the ability to structure. This temperature depends on the structuring fat as used and can routinely be determined for example based on the solid fat content profile (i.e. N-lines) of the structuring fat. Preferably the fat powder, after production, has not been subjected to temperatures above 25 degrees Celsius, more preferably 15, even more preferably 10 and most preferably 5.

The wrapper product according to the invention is a water in oil emulsion, and thus comprises a dispersed water phase (i.e. water droplets). Smaller water droplet sizes are preferred as this leads to increased microbiological stability and/or aid the firmness of the water in oil emulsion. Therefore, the water droplets in the wrapper product preferably have a water droplet size of less than 15 micrometer, more preferably less than 10 micrometer and even more preferably less than 5 micrometer.

Process for Making Wrapper Products

In a further aspect the invention relates to a process for the preparation of an edible fat water in oil emulsion wrapper product according to the invention comprising the step of mixing liquid oil with edible fat powder comprising structuring fat.

A suitable process for the preparation of such a wrapper product comprises the steps of:
a. mixing fat powder and oil wherein the fat powder comprises structuring fat to provide a slurry;
b. providing an aqueous phase;
c. mixing the slurry and aqueous phase to form an oil continuous emulsion.

Preferably the slurry is kept at a temperature equal to or below 25 degrees Celsius, and the aqueous phase is cooled prior to mixing to such an extent that the temperature of the mixture of slurry and aqueous phase is kept equal to or below 25 degrees Celsius.

Another suitable process for the preparation of such a wrapper product comprises the steps of:
a. providing an aqueous phase containing all the ingredients except for the edible fat powder;
b. mixing the aqueous phase and the edible fat powder to form a continuous emulsion.

Preferably the aqueous phase is cooled prior to mixing to such an extent that the temperature of the mixture of the edible fat powder and aqueous phase is kept equal to or below 25 degrees Celsius.

A preferred process for the preparation of an edible water in oil emulsion wrapper product comprises the step of mixing the fat powder with liquid oil and water.

Preferably the fat powder is prepared by supercritical melt micronisation.

The oil in the slurry or in the aqueous phase is liquid oil and may be single oil or a mixture of different oils, and may comprise other components. Preferably at least 50 wt % of the oil (based on total amount of oil) is of vegetable origin, more preferably at least 60 wt %, even more preferably at least 70 wt %, still more preferably at least 80 wt %, even still more preferably at least 90 wt % and even still more further preferably at least 95 wt %. Most preferably the oil essentially consists of oil of vegetable origin.

In a further aspect the invention relates to the products according to the invention as described herein obtainable by the process according to the invention as described herein, like for example a process wherein fat powder comprising structuring fat is used.

The invention is now illustrated by the following non limiting examples.

EXAMPLES

Stevens Value

Stevens values give an indication about the hardness (also called firmness) of a product. The Stevens value is determined according to the following protocol.

Freshly prepared products are stabilized at 5 degrees Celsius. To determine the hardness at 20 degrees Celsius the sample is stored at 20 degrees Celsius for at least 24 hours after stabilization at 5 degrees Celsius for at least one week. After stabilization at 5 and at 20 degrees Celsius the hardness of the product is measured at 5 and at 20 degrees Celsius with a Stevens penetrometer (Brookfield LFRA Texture Analyser (LFRA 1500), ex Brookfield Engineering Labs, UK) equipped with a stainless steel probe with a diameter of 4.4 mm and operated in "normal" mode. The probe is pushed into the product at a speed of 2 mm/s, a trigger force of 5 gram from a distance of 10 mm. The force required is read from the digital display and is expressed in grams.

Solid Fat Content Measured on Fat (SFC on Fat)

The solid fat content (SFC) in this description and claims is expressed as N-value, as defined in Fette, Seifen Anstrichmittel 80 180-186 (1978). The stabilization profile applied is heating to a temperature of 80 degrees Celsius, keeping the oil for at least 10 minutes at 60 degrees Celsius or higher, keeping the oil for 1 hour at 0 degrees Celsius and then 30 minutes at the measuring temperature.

Solid Fat Content Measured on Total Product (SFC on Total Product)

About 1.8 grams of the test product is sampled with a small piston like sample taker and subsequently pressed in to a glass tube of internal diameter of 8.8 mm and a glass wall thickness of 0.75 mm up to a height of about 3 cm. The temperature of the sample taker and of the glass tube have the same temperature as the temperature of the product. Then the tube is immediately placed in to the same measuring device as used for the measurement for SFC on fat (NMR, as defined in Fette, Seifen Anstrichmittel 80 180-186 (1978)) with the exception that RD (Relaxation Delay) is set to 4 instead of 2, and after about 8 seconds the measured value is read from the digital display. For each product and each temperature the average is taken of two measurements.

Heat Stability Test (% Free Oil)

About 3.6 grams of the test product is sampled with a small piston alike sample taker and subsequently pressed in to a glass tube of internal diameter of 8.8 mm and a glass wall thickness of 0.75 mm up to a height of about 6 cm. The tube is then placed in to one of the 50 holes of a at measuring temperature thermostatted aluminium block sized 8×9×20 cm, resp. height, width and length.

After two hours of stabilisation, the amount of free oil on top of the sample is measured by taking the height in the tube and represented as volume percent of oil.

Water Droplet Size Distribution of Spreads (D3,3 Measurement)

The normal terminology for Nuclear Magnetic Resonance (NMR) is used throughout this method. On the basis of this method the parameters D3,3 and exp($\sigma$) of a lognormal water droplet size distribution can be determined. The D3,3 is the volume weighted mean droplet diameter and $\sigma$ is the standard deviation of the logarithm of the droplet diameter.

The NMR signal (echo height) of the protons of the water in a water-in-oil emulsion are measured using a sequence of 4 radio frequency pulses in the presence (echo height E) and absence (echo height E*) of two magnetic field gradient pulses as a function of the gradient power. The oil protons are suppressed in the first part of the sequence by a relaxation filter. The ratio (R=E/E*) reflects the extent of restriction of the translational mobility of the water molecules in the water droplets and thereby is a measure of the water droplet size. By a mathematical procedure—which uses the log-normal droplet size distribution—the parameters of the water droplet size distribution D3,3 (volume weighed geometric mean diameter) and $\sigma$ (distribution width) are calculated.

A Bruker magnet with a field of 0.47 Tesla (20 MHz proton frequency) with an air gap of 25 mm is used (NMR Spectrometer Bruker Minispec MQ20 Grad, ex Bruker Optik GmbH, DE).

The droplet size of the spread is measured, according to the above described procedure, of a spread stabilized at 5 degrees Celsius right after production for one week. This gives the D3,3 after stabilization at 5 degrees Celsius.

Standard Bostwick Protocol

The Bostwick equipment consists of a 125 ml reservoir provided with an outlet near the bottom of a horizontally placed rectangular tub and closed with a vertical barrier. The tub's bottom is provided with a 25 cm measuring scale, extending from the outlet of the reservoir. When equipment and sample both have a temperature of 15 degrees Celsius, the reservoir is filled with 125 ml of the sample after it has been shaken by hand ten times up and down. When the closure of the reservoir is removed the sample flows from the reservoir and spreads over the tub bottom. The path length of the flow is measured after 15 seconds. The value, expressed as cm per seconds is the Bostwick value, which is used as yard stick for pourability. The maximum value that can be determined with this measurement is 23 cm.

Wrapper Product Composition

Wrapper products with a composition as in Table 1 were made according to the methods as described below.

TABLE 1

| Wrapper product formulation (wt %) | | | | |
|---|---|---|---|---|
| Example | 1/C-1 | 2/C-2 | 3/C-3 | 4/C-4 |
| Fat level (on product) | 80 | 60 | 80 | 60 |
| SAFA (on fat) | 30 | 30 | 25 | 25 |
| FAT MIX: | | | | |
| inES48 # | 30 | 30 | 23.7 | 23.7 |
| Rapeseed oil | 70 | 70 | 76.3 | 76.3 |

TABLE 1-continued

Wrapper product formulation (wt %)

| Example | 1/C-1 | 2/C-2 | 3/C-3 | 4/C-4 |
|---|---|---|---|---|
| PRODUCT FORMULATION: Fat phase | | | | |
| Fat MIX | 79.833 | 60.167 | 79.833 | 60.167 |
| Dimodan HP | 0.100 | 0.100 | 0.100 | 0.100 |
| Vitamins and the colorant | 0.150 | 0.150 | 0.150 | 0.150 |
| Sunflower lecithin | 0.250 | 0.250 | 0.250 | 0.250 |
| Aqueous phase | | | | |
| Water | 18.575 | 37.149 | 18.575 | 37.149 |
| NaCl | 0.667 | 1.333 | 0.667 | 1.333 |
| Skimmed milk powder | 0.333 | 0.667 | 0.333 | 0.667 |
| Potassium sorbate | 0.067 | 0.133 | 0.067 | 0.133 |
| Citric acid | 0.025 | 0.051 | 0.025 | 0.051 | inES48 is an interesterified mixture of 65% dry fractionated palm oil stearin with an Iodine Value of 14 and 35% palm kernel oil. For examples 1 to 4 a fat powder of inES48 was used that was obtained using a supercritical melt micronisation process as described below. For comparative examples C-1 to C-4 the inES48 was used as such (i.e. it was molten during the preparation of the premix).
Dimodan HP is a molecularly distilled mono/diacylglyceride mixture derived from fully hardened palm oil (90% monoglyceride) ex Danisco.

Preparation of Edible Fat Powders
Set Up for Continuous Production of Fat Powder FIG. 1 is a schematic representation of the set up for the continuous production of edible fat powder as used for the preparation of examples 1 to 4.

Set-up consists of an inlet for molten fat (7) and an inlet for supercritical $CO_2$ (6) leading into a static mixer (8) (Sulzer SMX DN10 with 11 elements) to provide a $CO_2$-melt mixture that is subsequently cooled in a heat exchanger (9) to the desired temperature-pressure conditions at pressure swirl nozzle (2) (SK series "SprayDry®" nozzle, with orifice insert diameter of 0.340 mm and core size no. 16 and orifice insert nr 78, ex Spray Systems).

The fat is drawn from a thermo-stated storage tank with a Lewa membrane pump equipped with food-grade oil. A similar pump is used to draw liquid $CO_2$ from a storage tank at low temperature. The temperature at which the liquid $CO_2$ is pumped should be low enough to avoid cavitation in the pump. In between the pump and the mixing point with the fat the $CO_2$ is heated to the same temperature as the fat in a tubular heat exchanger.

The $CO_2$-melt mixture is sprayed into expansion vessel (1) via nozzle (2).

The expansion vessel is thermally insulated and is essentially at atmospheric pressure. The cylindrical middle section has a diameter of 15 cm and a height of 77 cm. The conical bottom section has a height of 8 cm and is converging to an opening of diameter 7 cm, which can be closed with a simple valve when a full powder collection drum (5) has to be replaced with an empty one without interrupting the process. An additional stream of $N_2$ cooling gas (3) is fed into the expansion vessel from behind the nozzle. Its flow rate has to be chosen such that the desired final temperature of the powder is reached. The gas leaves the expansion vessel via a fine grid (4) along the circumference of the vessel just above the conical part. The tubing (10) connecting the parts up to the nozzle has an internal diameter of 9 mm. The length between the static mixer and the nozzle is about 5 meter.

Preparation of Fat Powders

A stream of molten fat (7) of about 25 kg per hour was combined with a stream of about 10 kg per hour of supercritical $CO_2$ (6) at a pressure and temperature at which a substantial amount of $CO_2$ dissolved into the molten fat of about 250 bar, resulting in a melt of molten fat and dissolved $CO_2$. After passing the static mixer (8) for rapid dissolution of the $CO_2$, the $CO_2$-melt mixture was cooled to the chosen nozzle temperature of about 50 degrees Celsius in the heat exchanger (9). The $CO_2$-melt mixture was expanded (i.e. sprayed) over the nozzle (2) to atmospheric pressure in expansion vessel (1) and external $N_2$ gas (3), at the top of the expansion vessel was used for additional cooling to obtain a gas/powder outlet temperature at the bottom of the expansion vessel of minus 5 degrees Celsius. Upon expansion of the $CO_2$-melt mixture into the expansion vessel the evaporation of dissolved $CO_2$ and the entrainment of $N_2$ gas into the spray caused crash-cooling conditions, which lead to very rapid solidification. The resulting powder was collected in drum (5) below the expansion vessel and stored at a temperature of 5 degrees Celsius.

Examples According to the Invention

Examples 1 to 4

The Dimodan HP was weighed and mixed with 2 parts of the oil and heated to 75 degrees Celsius followed by pouring this mix in to the remainder 1 part of the oil at about 17 degrees Celsius in an EscoLabor (ESCO-double wall Vacuum mixer processing plant Type EL3 with 4.5 liter vessel in pharmaceutical version, ex ESCO-Labor AG, CH) which was cooled at about 17 degrees Celsius using a cooling machine (Huber HS40 thermostatted at 16 degrees Celsius). Then the other fat ingredients were added like colorant, vitamins and lecithin. The completed water phase, pasteurised and cooled down to about 10 degrees Celsius was added slowly while using an Ultra Turrax at high speed (ca. 15000 rpm) (X10/20-750 ULTRA-TURRAX®, ex Ystral GmbH, DE), thus creating a finely disperse water in oil system.

The fat powder was taken from the 5 degrees Celsius storage cabinet, weighed and added to the mix of about 12 degrees Celsius under vacuum, followed by a de-aeration step while using a stirrer equipped with scraper blades for about 15 minutes at about 150 mbar, after which the evacuated tank was opened and product was filled at a final temperature of about 18 degrees Celsius and stored at 5 degrees Celsius. The product was soft at filling and required a pre-folded wrapper type of filling.

Comparative Examples

Not According to the Invention, C-1 to C-4

A premix of the water in oil type was prepared in a 5 liter double wall stainless steel vessel equipped with a stirrer operating at about 80 rpm and one baffle kept at 60° C. The mixture was subsequently pumped through a set of Scraped Surface Heat Exchangers (A-unit) and a pin stirrer (C-unit) followed by a holding tube (B-unit) at the end, the so-called Votator, to finalise the product with a firm consistency enabling the packaging into a foil.

The sequence being as follows: Tank-pump-flow meter-pressure meter-A-C-A-A-B, where the A-units have a rotor equipped with two stainless steel scraper blades operating at 1000 rpm having an annulus of 3 mm and a volume of 18 cubic cm and where the C-unit is equipped with a rotor and stator both having two rows of 4 pins and operating at 200 rpm. The throughput is about 7 kg per hour with a temperature profile of resp. 25-27, 27-29, 17-19, 9-14 and 12-15 degrees Celsius after the end of the units. Products were stored at 5 degrees Celsius.

Results

For examples 1 to 4 and comparative examples C-1 to C-4 the following was measured: Stevens value at 5 and 20 degrees Celsius, solid fat content measured on total product, % free oil (i.e. heat stability) and water droplet size. The results are given in Table 2.

TABLE 2

Stevens value, solid fat content on total product, % free oil and droplet size

| | Examples | | | | | | | |
|---|---|---|---|---|---|---|---|---|
| | 1 | 2 | 3 | 4 | C-1 | C-2 | C-3 | C-4 |
| SAFA (wt % on fat) | 30 | 30 | 25 | 25 | 30 | 30 | 25 | 25 |
| Stevens value 5° C. (g) | 382 | 288 | 169 | 143 | 138 | 120 | 66 | 66 |
| Stevens value 20° C. (g) | 197 | 144 | 67 | 58 | 80 | 85 | 61 | 49 |
| Solid Fat Content on total product: | | | | | | | | |
| 35° C. | 5.5 | 4.3 | 4.3 | 3.7 | 5.9 | 4.8 | 4.5 | 3.3 |
| 40° C. | 2.4 | 1.9 | 2.0 | 1.5 | 3.0 | 2.6 | 2.3 | 2.0 |
| 44° C. | 0.3 | 0.3 | 0.3 | 0 | 0.9 | 0.8 | 0.4 | 0.8 |
| % Free oil: | | | | | | | | |
| 35° C. | 0 | 0 | 0 | 0 | 0.1 | 0.2 | 0.2 | 3.6 |
| 40° C. | 0 | 0 | 0 | 0.1 | 4.5 | 6.2 | 3.0 | 17.5 |
| 44° C. | 29.7 | 54.0 | 64.1 | 55.6 | 34.3 | 36.9 | 44.8 | 44.4 |
| Droplet size: | | | | | | | | |
| D33 (μ)/e$^\sigma$ | 4.5/1.7 | 7/2.4 | 4.6/1.9 | 6.1/2.1 | 3.4/1.2 | 3.2/1.4 | 2.7/1.9 | 3.9/2 |

Solid Fat Content of Fat MIX

The solid fat content on fat was measured for the fat MIX used in examples 1/2 and comparative examples C-1/C-2 as well as the fat MIX used in examples 3/4 and comparative examples C-3/C-4. The results are given in Table 3.

TABLE 3

Solid fat content of fat MIX

| | Fat MIX (wt %): | |
|---|---|---|
| As used in: | 30 inES48/70 rapeseed oil Examples 1/2 and C-1/C-2 | 23.7 inES48/76.3 rapeseed oil Examples 3/4 and C-3/C-4 |
| N10 | 28.2 | 22.8 |
| N20 | 17.9 | 14 |
| N30 | 9.9 | 7.4 |
| N35 | 6.2 | 4.4 |
| N40 | 2 | 1.2 |

The invention claimed is:

1. Edible water in oil emulsion wrapper product comprising water and at least 50 wt % fat wherein the fat is essentially free of hydrogenated fat and wherein said fat comprises less than 35 wt % saturated fatty acid, calculated on total fat, and less than 1 wt % trans unsaturated fatty acid, calculated on total product, wherein the emulsion is prepared using edible fat powder comprising structuring fat wherein the amount of oil exudation is less than 1% at the temperature at which the amount of solid fat content on total product is 3%, said wrapper product having a Stevens hardness value of more than 140 gram at 5 degrees Celsius and more than 50 gram at 20 degrees Celsius.

2. Wrapper product according to claim 1 wherein the amount of saturated fatty acid is less than 30 wt.

3. Wrapper product according to claim 1 wherein the amount of fat is from 50 to 95 wt %.

4. Wrapper product according to claim 1 wherein the amount of trans unsaturated fatty acid is less than 1 wt % calculated on total fat.

5. Wrapper product according to claim 1 wherein less than 50 wt % of the fat is interesterified.

6. Wrapper product according to claim 1 wherein the amount of oil exudation is less than 1% at the temperature at which the amount of solid fat content on total product is 2.5%.

7. Wrapper product according to claim 1 wherein the emulsion is prepared using edible fat powder comprising structuring fat obtainable by supercritical melt micronisation.

8. Wrapper product according to claim 1 wherein the Stevens hardness value at 5 degrees Celsius is from 150 to 2000 gram.

9. Wrapper product according to claim 1 wherein the Stevens hardness value at 20 degrees Celsius is from 50 to 500 gram.

10. Wrapper product according to claim 1 wherein the solid fat content measured on fat is 17 to 50 for N10, 11 to 35 for N20, 3 to 18 for N30, 0 to 10 for N35 and 0 to 5 for N40.

11. Wrapper product according to claim 1 having a water droplet size of less than 15 micrometer.

12. Process for the preparation of an edible water in oil emulsion wrapper product according to claim 1 comprising the step of mixing liquid oil with edible fat powder comprising structuring fat.

13. Process according to claim 12 comprising the step of mixing the fat powder with liquid oil and water.

14. Process according to claim 12 wherein the fat powder is prepared by supercritical melt micronisation.

15. The wrapper product according to claim 1 wherein the water is present in an aqueous phase, and the aqueous phase comprising from 20% to 39% of the wrapper product.

* * * * *